US011080099B2

(12) United States Patent
Kyaw et al.

(10) Patent No.: US 11,080,099 B2
(45) Date of Patent: *Aug. 3, 2021

(54) SYSTEMS AND METHODS FOR DYNAMIC PARTITIONING IN DISTRIBUTED ENVIRONMENTS

(71) Applicants: Thu R. Kyaw, Reston, VA (US); Jonathan Ji, Aldie, VA (US); Saad Mufti, Fairfax, VA (US); Sudhir Achuthan, Vienna, VA (US); Sang Chul Song, Aldie, VA (US)

(72) Inventors: Thu R. Kyaw, Reston, VA (US); Jonathan Ji, Aldie, VA (US); Saad Mufti, Fairfax, VA (US); Sudhir Achuthan, Vienna, VA (US); Sang Chul Song, Aldie, VA (US)

(73) Assignee: Verizon Media Inc., New York, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/198,133

(22) Filed: Nov. 21, 2018

(65) Prior Publication Data

US 2020/0159594 A1    May 21, 2020

(51) Int. Cl.
*G06F 9/50* (2006.01)
*G06F 16/28* (2019.01)

(52) U.S. Cl.
CPC .......... *G06F 9/5077* (2013.01); *G06F 9/5083* (2013.01); *G06F 16/285* (2019.01)

(58) Field of Classification Search
CPC .............................. G06F 9/5077; G06F 16/285

USPC ..................................................... 718/1–108
See application file for complete search history.

(56) References Cited

U.S. PATENT DOCUMENTS

| 7,590,620 | B1 * | 9/2009 | Pike | .................... G06F 11/1482 |
| 8,090,754 | B2 * | 1/2012 | Schmidt | ................ G06F 16/284 |
| | | | | 707/726 |
| 8,954,967 | B2 * | 2/2015 | Balmin | ................. G06F 9/5066 |
| | | | | 718/100 |

(Continued)

OTHER PUBLICATIONS

S. Paul and V. Saravanan, "Hash Partitioned apriori in Parallel and Distributed Data Mining Environment with Dynamic Data Allocation Approach," 2008 International Conference on Computer Science and Information Technology, Singapore, 2008, pp. 481-485. (Year: 2008).*

(Continued)

*Primary Examiner* — Satish Rampuria
(74) *Attorney, Agent, or Firm* — Bookoff McAndrews, PLLC

(57) ABSTRACT

Methods, systems, and computer-readable media are disclosed for dynamic partitioning in distributed computing environments. One method includes: receiving a first data set and a second data set; mapping the first data set into a first set of key-value pairs; mapping the second data set into a second set of key-value pairs; estimating, using a sketch, a frequency count for each key based on the first set of key-value pairs and the second set of key-value pairs; determining whether the estimated frequency count for each key is greater than or equal to a predetermined threshold; and partitioning the key when the estimated frequency count for the key is greater than or equal to the predetermined threshold.

14 Claims, 8 Drawing Sheets

(56) References Cited

U.S. PATENT DOCUMENTS

2001/0011268 A1* 8/2001 Tsuchida ............... G06F 9/5083
2015/0134626 A1* 5/2015 Theimer ............ G06F 11/3006
707/693

OTHER PUBLICATIONS

Aguilar-Saborit, Josep, et al. "Dynamic adaptive data structures for monitoring data streams." Data & Knowledge Engineering 66.1 (2008): pp. 92-115. (Year: 2008).*

Hu, Yanyan, et al. "I/O scheduling model of virtual machine based on multi-core dynamic partitioning." Proceedings of the 19th ACM International Symposium on High Performance Distributed Computing. 2010.pp. 142-154 (Year: 2010).*

Chun, Byung-Gon, and Petros Maniatis. "Dynamically partitioning applications between weak devices and clouds." Proceedings of the 1st ACM Workshop on Mobile Cloud Computing & Services: Social Networks and Beyond. 2010.pp. 1-5 (Year: 2010).*

De Jong, Gjalt, et al. "Background memory management for dynamic data structure intensive processing systems." Proceedings of IEEE International Conference on Computer Aided Design (ICCAD). IEEE, 1995.pp. 515-520 (Year: 1995).*

Stitt, Greg, Roman Lysecky, and Frank Vahid. "Dynamic hardware/software partitioning: a first approach." Proceedings of the 40th annual Design Automation Conference. 2003.pp. 250-255 (Year: 2003).*

Kwon, YongChul. et al., "Skew-Resistant Parallel Processing of Feature-Extracting Scientific User-Defined Functions." SoCC 2010, Jun. 10-11, 2010, Indianapolis, Indiana, USA.

Kwon, YongChul et al., "SkewTune: Mitigating Skew in MapReduce Applications." SIGMOD 2012, May 20-24, 2012, Scottsdale, Arizona, USA.

Kwon, YongChul et al., "Managing Skew in Hadoop." Bulletin of the IEEE Computer Society Technical Committee on Data Engineering. 2013, pp. 1-10.

* cited by examiner

| PARAMETERS | DURATION | SAVINGS | AVERAGE MAP TIME | AVERAGE SHUFFLE TIME | AVERAGE MERGE TIME | AVERAGE REDUCE TIME |
|---|---|---|---|---|---|---|
| 750K, BIASED RANDOM, 5%, 316R | 2 HOURS, 22 MINUTES | 16% | 48 SECONDS | 33 MINUTES, 5 SECONDS | 3 SECONDS | 20 MINUTES, 49 SECONDS |
| 750K, BIASED RANDOM, 50%, 316R | 2 HOURS, 20 MINUTES, 15 SECONDS | 18% | 59 SECONDS | 20 MINUTES, 46 SECONDS | 3 SECONDS | 19 MINUTES, 52 SECONDS |
| 750K, BIASED RANDOM, 75%, 279R | 2 HOURS, 30 MINUTES, 31 SECONDS | 11% | 1 MINS, 6 SECONDS | 14 MINUTES, 42 SECONDS | 6 SECONDS | 23 MINUTES, 8 SECONDS |
| 750K, BIASED RANDOM, 100%, 316R | 2 HOURS, 32 MINUTES, | 11% | 1 MINS, 12 SECONDS | 14 MINUTES, 37 SECONDS | 3 SECONDS | 19 MINUTES, 48 SECONDS |
| 150K, BIASED RANDOM, 100%, 316R | 2 HOURS, 38 MINUTES, 13 SECONDS | 7% | 1 MINS, 12 SECONDS | 14 MINUTES, 41 SECONDS | 4 SECONDS | 19 MINUTES, 5 SECONDS |
| 750K, PLAIN INCREMENTAL, 100%, 316R | 2 HOURS, 26 MINUTES, 52 SECONDS | 14% | 1 MINS, 12 SECONDS | 15 MINUTES, 3 SECONDS | 3 SECONDS | 20 MINUTES, 11 SECONDS |
| 750K, PLAIN INCREMENTAL, 50%, 316R, S3 | 2 HOURS, 19 MINUTES, 9 SECONDS | 18% | 1 MINS, 1 SECONDS | 20 MINUTES, 46 SECONDS | 3 SECONDS | 18 MINUTES, 34 SECONDS |
| 550K, PLAIN INCREMENTAL, 50%, 316R, S3 | 2 HOURS, 5 MINUTES, 44 SECONDS | 26% | 1 MINS, 2 SECONDS | 21 MINUTES, 48 SECONDS | 3 SECONDS | 19 MINUTES, 29 SECONDS |

*PARAMETERS: GROUP SIZE, MODULUS FOR PARTITION, PERCENTAGE OF MAPS BEFORE REDUCES, NUMBER OF REDUCES

FIG. 5

SYSTEMS AND METHODS FOR DYNAMIC PARTITIONING IN DISTRIBUTED ENVIRONMENTS

CROSS-REFERENCE TO RELATED APPLICATION

This application is a continuation of and claims the benefit of priority to U.S. patent application Ser. No. 15/189,158, filed on Jun. 22, 2016, the entirety of which is incorporated herein by reference.

TECHNICAL FIELD

The present disclosure relates to dynamic partitioning in distributed computing environments. More particularly, the present disclosure relates to dynamic partitioning of keys based on frequency counters maintained locally and/or global in the distributed computing environment.

BACKGROUND

The integration of data from a plurality of data sources may produce large data sets that need to be managed efficiently and effectively. However, conventional methods of integrating large data sets have performance barriers because of the size of the data sets, which leads to relatively long processing times and relatively large computer resource use.

Several newer techniques of integrating data sets have been proposed to parallelize the integration process and reduce long processing times based on the MapReduce framework. In the MapReduce framework, data sets are partitioned into several blocks of data using keys assigned by map task operations and allocated in parallel to reduce task operations.

A common problem with the MapReduce framework is data skew, which occurs when the workload is non-uniformly distributed. When typical data skew occurs, computer resources that process a reduce task receive a relatively large amount of workload and require a relatively longer amount of processing time to complete the tasks compared to other computer resources that process other reduce tasks, which diminishes the benefits of parallelization.

Thus, embodiments of the present disclosure relate to dynamic partitioning of tasks in a distributed computing environment to improve data processing speed.

SUMMARY OF THE DISCLOSURE

Embodiments of the present disclosure include systems, methods, and computer-readable media for dynamic partitioning in distributed computing environments.

According to embodiments of the present disclosure, computer-implemented methods are disclosed for dynamic partitioning in distributed computing environments. One method includes: receiving, at a processor, a first data set and a second data set; mapping, by the processor, the first data set into a first set of key-value pairs; mapping, by the processor, the second data set into a second set of key-value pairs; estimating, by the processor using a sketch, a frequency count for each key based on the first set of key-value pairs and the second set of key-value pairs; determining, by the processor, whether the estimated frequency count for each key is greater than or equal to a predetermined threshold; and partitioning, by the processor, the key when the estimated frequency count for the key is greater than or equal to the predetermined threshold.

According to embodiments of the present disclosure, systems are disclosed for dynamic partitioning in distributed computing environments. One system includes a data storage device that stores instructions system for dynamic partitioning in distributed computing environments; and a processor configured to execute the instructions to perform a method including: receiving a first data set and a second data set; mapping the first data set into a first set of key-value pairs; mapping the second data set into a second set of key-value pairs; estimating, using a sketch, a frequency count for each key based on the first set of key-value pairs and the second set of key-value pairs; determining whether the estimated frequency count for each key is greater than or equal to a predetermined threshold; and partitioning the key when the estimated frequency count for the key is greater than or equal to the predetermined threshold.

According to embodiments of the present disclosure, non-transitory computer-readable media storing instructions that, when executed by a computer, cause the computer to perform a method for dynamic partitioning in distributed computing environments are also disclosed. One method of the non-transitory computer-readable medium including: receiving a first data set and a second data set; mapping the first data set into a first set of key-value pairs; mapping the second data set into a second set of key-value pairs; estimating, using a sketch, a frequency count for each key based on the first set of key-value pairs and the second set of key-value pairs; determining whether the estimated frequency count for each key is greater than or equal to a predetermined threshold; and partitioning the key when the estimated frequency count for the key is greater than or equal to the predetermined threshold.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts a table of performance results for a MapReduce framework using a global frequency counter, according to embodiments of the present disclosure.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION OF EMBODIMENTS

The following detailed description refers to the accompanying drawings. The same reference numbers in different drawings may identify the same or similar elements.

A data analysis platform may process relatively large amounts of data to learn insights from the data. For example, an advertiser may have a relatively large of amount of data relating to advertisements and campaigns. To determine the effectiveness and/or improve the effectiveness of an advertisement and/or campaign, the data may be stored in a software framework for distributed storage and distributed processing, such as with Hadoop. In particular, Hadoop may be utilized for distributed processing of the data, and the Hadoop distributed file system ("HDFS") may be used for organizing communications and storage of the data. Clusters and/or nodes may be generated that also utilize HDFS. For example, a cluster computing framework, such as Spark, may be arranged to further utilize the HDFS of the Hadoop clusters. A Hadoop cluster may allow for the distributed processing of large data sets across clusters of computers using programming models. A Hadoop cluster may scale up from single servers to thousands of machines, each offering local computation and storage.

Accessing and organizing data in a large distributed system may be difficult and require specialized functionality for efficient operations. In one example, a MapReduce framework may be provided for accessing and processing data from the distributed computing system. According to embodiments of the present disclosure, a MapReduce framework may be used to process records/events related to a particular unique identifier (e.g., an advertiser id and/or a campaign id) in parallel. Thus, the workload of processing for a large number of records/events may be divided among a plurality of MapReduce nodes and divided among a plurality of computers within the MapReduce framework.

Figure 1:
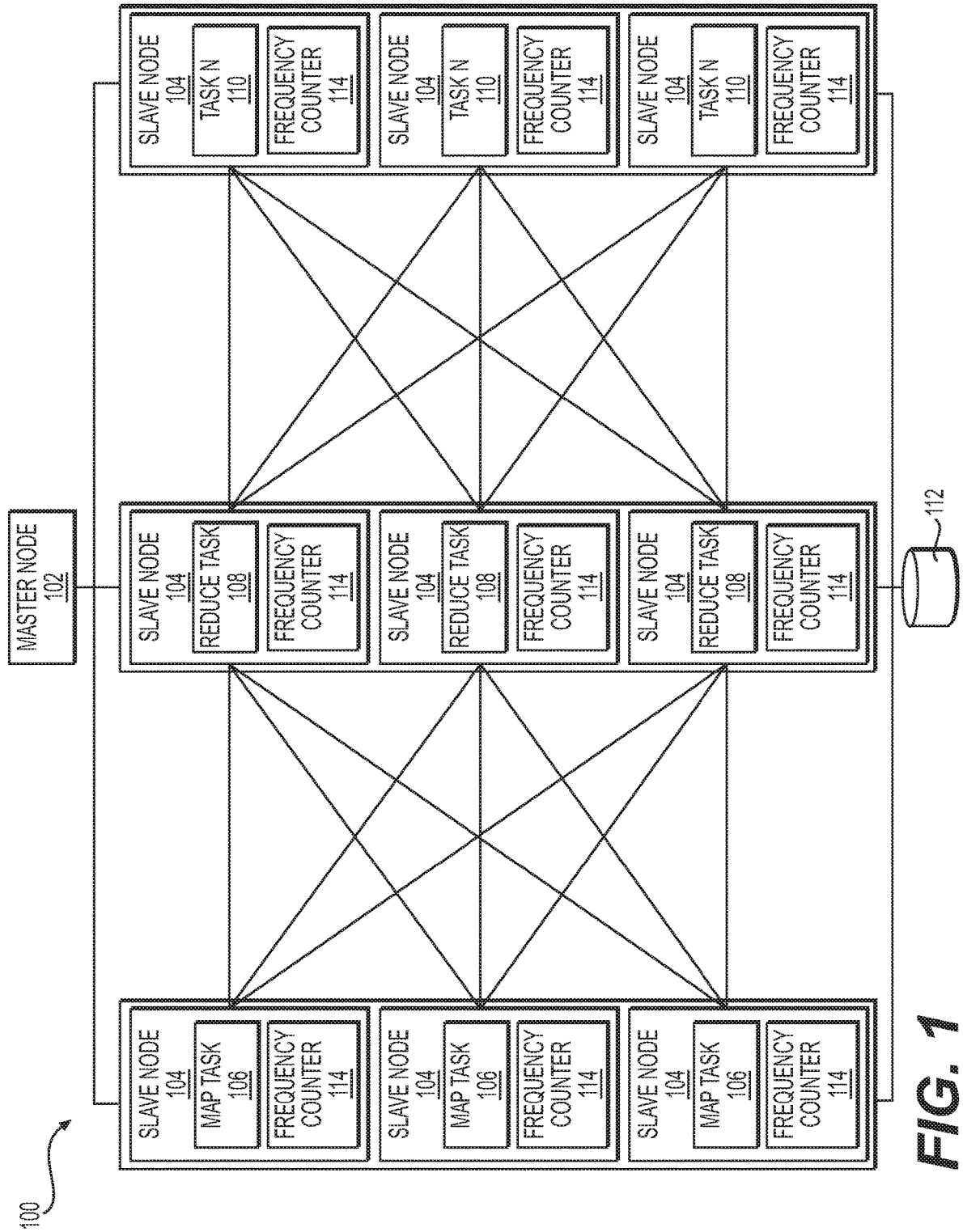
FIG. 1 depicts a system implementing a MapReduce framework for dynamic partitioning of in a distributed environment, according to embodiments of the present disclosure.

FIG. 1 depicts a system implementing a MapReduce framework, according to embodiments of the present disclosure. The system includes a cluster 100 of nodes working in parallel. Each node may be a computer, a processor, or a processing. The cluster 100 includes a master node 102 and a plurality of slave nodes 104, which performs MapReduce tasks and/or other tasks. As discussed in more detail below, MapReduce tasks include map tasks and reduce tasks. A data set received by the cluster 100 may be split into independent chunks of data that are processed by a map tasks in parallel. The map tasks may produce a set of key-value pairs. The MapReduce framework may group the outputs of the map tasks by their respective keys, which may be input into the reduce tasks. The grouping of keys (also referred to as shuffling) may be a time consuming process when the number of map task results is relatively large. Reduce tasks may consolidate the outputs from the map tasks into final results. The slave nodes 104 may include a plurality of map task nodes 106, a plurality of reduce tasks nodes 108, and/or a plurality of other tasks N nodes 110. The master node 102 may divide a data set into smaller data chunks and distributes the smaller data chunks to the map task nodes 106. Each reduce task node 108 may combine the output received from the map tasks nodes 106 into a single result. Each node in the cluster 100 may be coupled to a database 112. The results of each stage of the MapReduce tasks may be stored in the database 112, and the nodes in the cluster 100 may obtain the results from the database 112 in order to perform subsequent processing.

As discussed above, a data set that is received may include a set of records/events that relate to a particular unique identifier (e.g., an advertiser id and/or a campaign id). When the data set is received, a unique key may be assigned to the data in the data set in order to uniquely identify the data. Another data set may also be received from the same data provider and/or different data provider and include another set of records/events that related to another particular unique identifier (e.g., another advertiser id and/or another campaign id). A unique key may be assigned to the second data of the second data set in order to uniquely identify the second data.

The set of records/events of the data sets may then be linked by matching records/events of the data sets. For example, a record/event of the data set may be assigned with a first key, and other records/events of the data set with the same first key may be grouped into a block. The records/events of the block may be compared with each other to determine whether the information within the records/events match or do not match.

The MapReduce framework may be used to efficiently process the linking of records/events of data sets. As mentioned above, the MapReduce framework includes two major tasks, i.e., map and reduce. The map task inputs the data of the data set, and assigns a key to a record/event. The reduce task receives all values which have the same key, and processes these groups. The map and reduce tasks may simplified by the following algorithmic formulas:

$$\text{map}::(K_1, V_1) \dashrightarrow \text{list}(K_2, V_2)$$

$$\text{reduce}::(K_2, \text{list}(V_2)) \dashrightarrow \text{list}(V_3)$$

For example, the map task may output one or more key-value pairs. The reduce task may receive a list of values for a particular key, and, after computation, output a new list of values. Through mapping and reducing, the records/events included in the data sets may be separated into smaller units and distributed to different computing resources that may be run in parallel.

In the map phase, input data may be processed by map tasks in parallel, the intermediate outputs of the map tasks may be collected locally and grouped based on their respective key values. Based on a partition function (such as a default hashing function and/or a user-defined function), the groups may be allocated to a reduce task depending on their keys. Upon completion of the map tasks and the intermediate results being transferred to the respective reduce task, reduce task operations may begin. The reduce task operations may also be processed in parallel for each key group.

Figure 2:
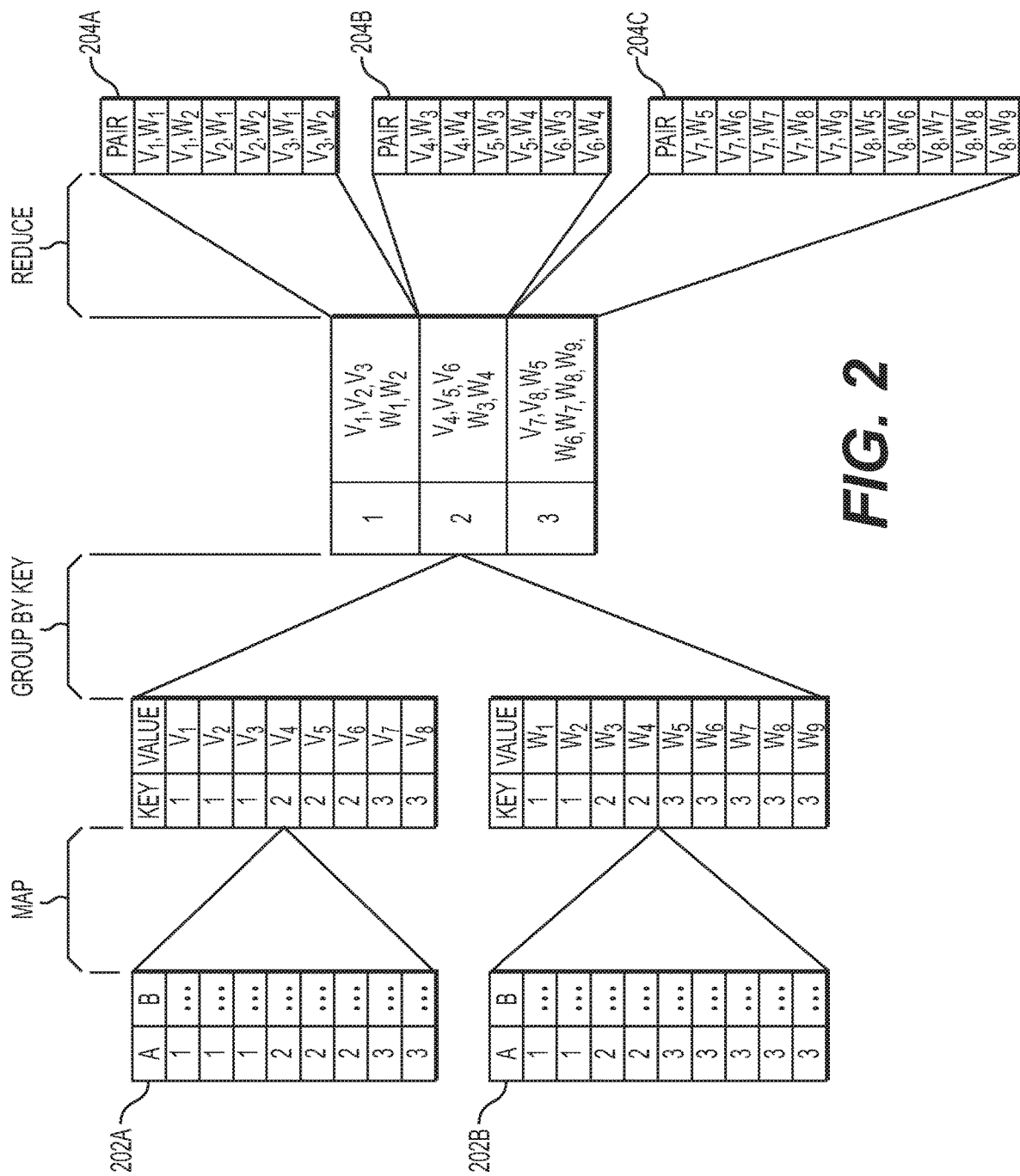
FIG. 2 depicts an exemplary blocking-based records/events linking using the MapReduce framework, according to embodiments of the present disclosure.

As mentioned above, the data sets may be partitioned into several blocks of data using keys by map tasks, and assigned in parallel to reduce tasks. FIG. 2 depicts an exemplary blocking-based records/events linking using the MapReduce framework, according to embodiments of the present disclosure. Field A of a data sets 202A and 202 B may be used as the key, and the records/events B of the respective data sets 202A and 202B may be mapped, and then be processed by the same reduce task computing resources.

With the MapReduce framework data skew occurs when the workload is non-uniformly distributed. When typical data skew occurs, computer resources that process reduce tasks may receive a relatively large amount of key-value pairs, and may require a relatively longer amount of processing time to complete the reduce tasks compared to other computer resources that process other reduce tasks. Such an uneven distribution of key-value pairs may reduce the benefits of parallelization. For example, as shown in FIG. 1, the computing resources needed for reduce task operations 204A, 204B may compare six record/event pairs, but the computing resources need for reduce task operations 204C may compare ten record/event pairs.

When the block size distribution is skewed, the MapReduce framework may assign some computing resources for reduce task operations with a larger workload, such as 204C. Data skew occurs because of the imbalanced distribution of block sizes. To alleviate the imbalanced distribution of block sizes, each map task operation may maintain a frequency counter per key. The frequency counter per key may be used in conjunction with a predetermined threshold to one or more of split a key, create sub-keys, and/or to allocate record/event pairs to particular computing resources to ensure that a load of the computer resources is balanced.

Additionally, to alleviate the imbalanced distribution of block sizes, each reduce task operation and/or each stage of a MapReduce operation may maintain a frequency counter per key. The frequency counter per key may be used in conjunction with an overall predetermined threshold, a reduce task predetermined threshold, and/or a stage predetermined threshold to one or more of split a key, create sub-keys, and/or to allocate record/event pairs to particular computing resources to ensure that a load of the computer resources is balanced.

In order to estimate a frequency count per key, the data sets may be examined to produce a workload estimation based on a sketch of the data sets 202A and 202B. The frequency counter may use various algorithms, such as an algorithm that uses a lossy count and/or an algorithm that uses sketches to count the number of values. A sketch may be a data structure that provides space-efficient summaries for large and frequently updated data sets. A sketch data structure may estimate a number of values that have been assigned to a certain key for the data set. In one embodiment, the sketch data structure may be one or more of a count-min sketch, a hyperloglog, a bloomfilter, a minhash, and/or a cuckoo filter. In a count-min sketch, hash functions may be used to map records/events to frequencies. For example, a slave node 104 that process map tasks 106 may use a frequency counter 114 to estimate a number of values that are repeated in over a predetermined fraction of the rows, for each column of data being processed.

For example, the frequency counter 114 may use a sketch when inputting a stream of records/events, one at a time, of a data set, such as data set 202A and 202B, and the frequency counter 114 may count a frequency of the different types of records/events in the stream. The sketch may be used as an estimated frequency of each record/event type. The count-min sketch data structure may be a two-dimensional array of cells with w columns and d rows. The values for the parameters w and d may be fixed when the sketch is created, and may be used to determine time and space needs and the probability of error when the sketch is queried for a frequency. Associated with each of the d rows is a separate and independent hash function. Each hash function $h_i$ maps a blocking key k into a hashing space of size w. The parameters w and d may be set with $w=\lceil e/\varepsilon \rceil$ and $d=\lceil \ln 1/\delta \rceil$, where the error in answering a query is within a factor of $\varepsilon$ with probability $\delta$.

Each cell of the two-dimensional array of a sketch may include a counter, and initially, all of each counter in the array may be set to zero. When a new record/event of type is detected (i.e., a new key k is detect), the counters may be incremented. If a counter of a cell of the two-dimensional array of the sketch is greater than or equal to a predetermined count threshold for the particular key k, then the individual map task may partition (split) the key into two or more sub-keys with the map task operation. The predetermined count threshold may be a predetermined value and/or a range of values that may be determined empirically and/or dynamically. For example, a dynamically predetermined count threshold may use machine learning to determine a value or a range of values for the predetermined count threshold.

Figure 3:
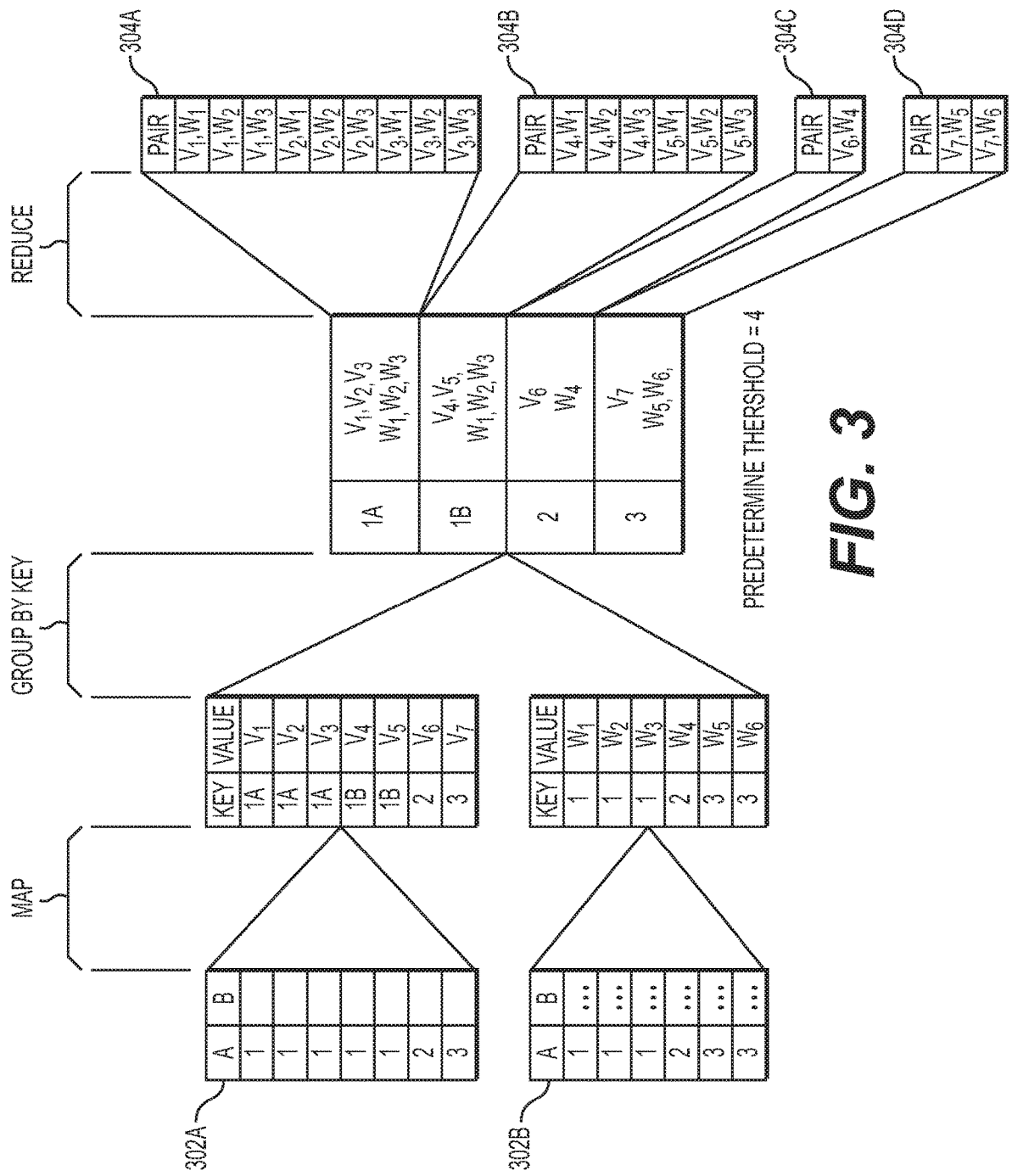
FIG. 3 depicts an exemplary blocking-based records/events linking using the MapReduce framework that includes a predetermined threshold when mapping data sets, according to embodiments of the present disclosure.

FIG. 3 depicts an exemplary blocking-based records/events linking using the MapReduce framework that includes a predetermined threshold when mapping data sets, according to embodiments of the present disclosure. Field A of a data sets 302A and 302 B may be used as the blocking key, and the records/events B of the respective data sets 302A and 302B may be mapped, and then the key pairs may be processed by the same reduce task computing resources. As shown in FIG. 2, the predetermined threshold for determining whether a mapper should partition (split) a key may be 4. When the frequency of the key 1 is determined to be 4, the mapper may split the key 1 into keys 1A and 1B. With the partitioning (splitting) of the keys, the computing resources needed for reduce task operations 304A may compare nine record/event pairs, the computing resources needed for reduce task operations 304B may compare six record/event pairs, the computing resources needed for reduce task operations 304C may compare one record/event pair, and the computing resources needed for reduce task operations 304D may compare two record/event pairs. Without the partitioning of the keys, the computer resources for reduce task operations 304A and 304B would be combined and may compare fifteen record/event pairs, which is a relatively larger amount of processing needed to the other computing resources needed for reduce task operations 304C and 304D.

As discussed in detail above, each slave node that processes map tasks may include a frequency counter for each key using a sketch, and partitions a key when the frequency counter associated with the key exceeds a predetermined threshold. The above described frequency counter may allow for data skew to be mitigated locally at the slave node. In order to further mitigate data skew, the frequency counter for each key may be maintained globally.

Figure 4:
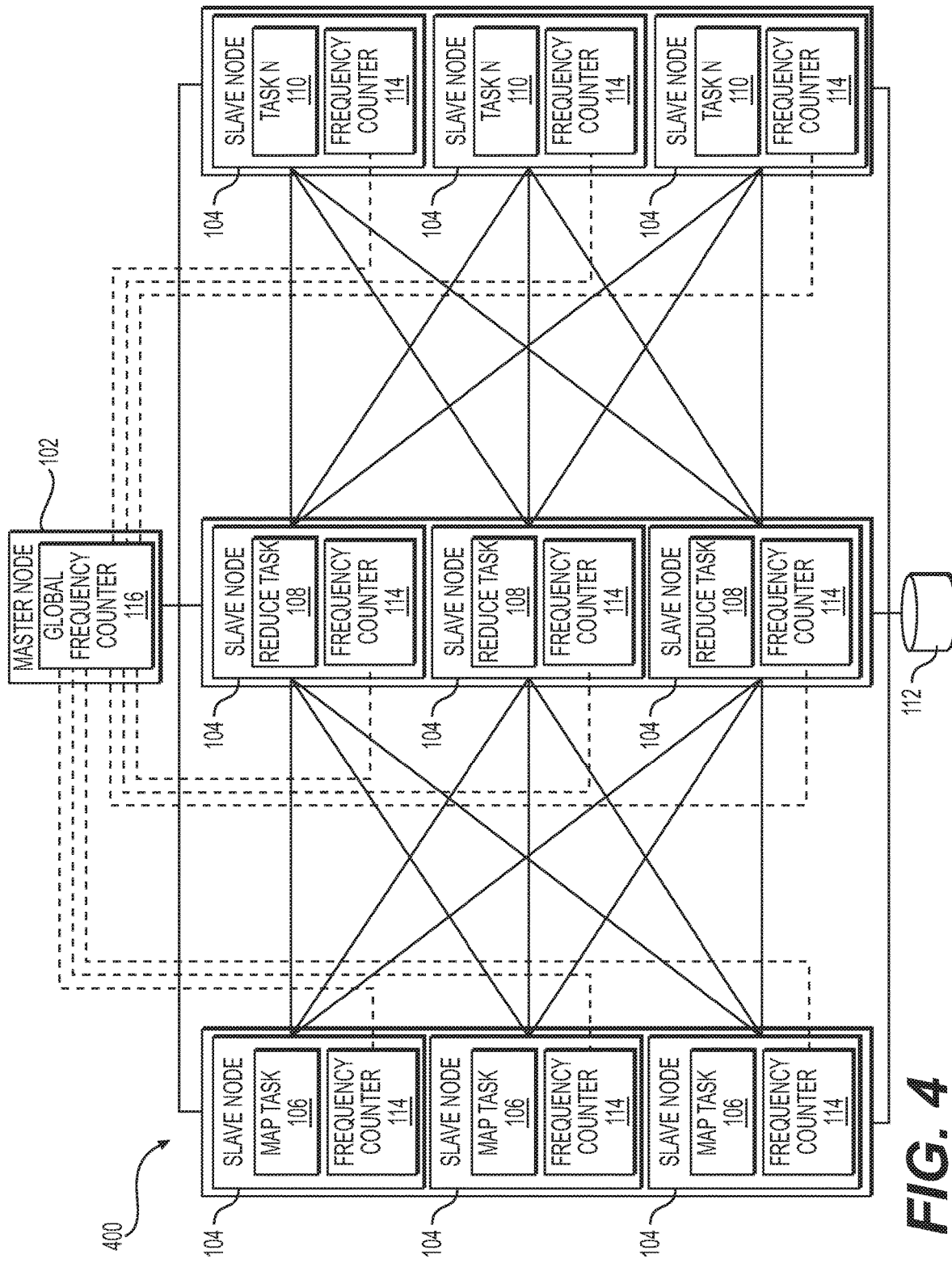
FIG. 4 depicts a system implementing a MapReduce framework for dynamic partitioning of in a distributed environment using a global frequency counter, according to embodiments of the present disclosure.

As shown FIG. 4, the master node 102 may also include a global frequency counter 116 that maintains a global frequency count for each key. The global frequency counter 116 may maintain a sketch, such as a count-min sketch, and the frequency counters 114 of the slave nodes 104 including map tasks 106, may retrieve the global frequency count for each key from the global frequency counter 116.

For example, the local frequency counters 114 of the slave nodes 104 including map tasks 106 may retrieve the global frequency count for each key from the global frequency counter 116. Then the slave nodes 104 may determine an updated frequency count for each key based on the estimated frequency counts for each key and the retrieved global frequency count for each key. The map tasks may then partition (split) their local keys based on the locally updated frequency counts for each key and the predetermined threshold. Upon completion of the map tasks, the local frequency counters 114 may transmit their local updated frequency counts for each key to the global frequency counter 116 of the master node 102.

FIG. 5 depicts a table of performance results for a MapReduce framework using a global frequency counter, according to embodiments of the present disclosure. The environment includes data from 20,599 files having a total size of 2.9 terabytes of data. The running environment was performed with 40,855 total map tasks, with 559 concurrent map tasks, and 316 total reduce tasks, with 279 concurrent reduce tasks, running Hadoop 2.7.1. The sketch used for frequency counting was a count-min sketch. The various parameters of each performance result are depicted in the table of FIG. 5. In another embodiment, the MapReduce framework may be substituted with a Spark framework, and an execution time may be reduced from about 2-3 hours to about 40 minutes. A Spark framework implementation may be similar to a MapReduce framework implementation. The Spark framework implementation may differ from the MapReduce framework implementation in that (i) data may be processed in a memory to reduce slow down due to disk input/output, (ii) map and reduce stages may not occur separately in order to avoid a total replicated disk write and network transfer, and (iii) a partition/re-partition of sub-keyed data may be done in memory with minimum shuffling.

Figure 6:
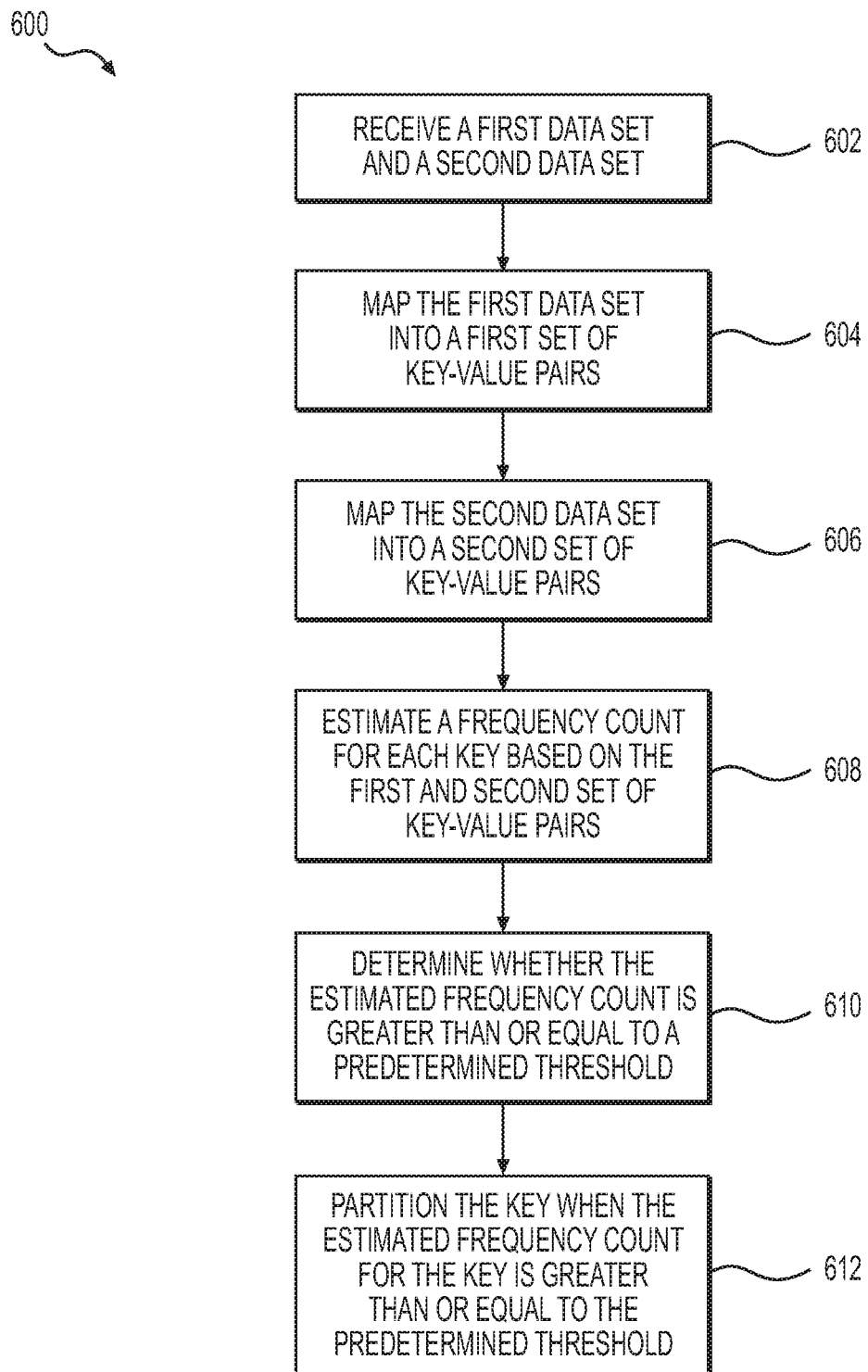
FIG. 6 depicts a method for dynamic partitioning of in a distributed environment, according to embodiments of the present disclosure.

FIG. 6 depicts a method for dynamic partitioning of in a distributed environment, according to embodiments of the present disclosure. The method 600 may begin at step 602 in which a node, such as the master node 102 and/or slave node 104, may receive a first data set and a second data set. When a master node receives the first data set and the second data set, the master node may distribute a portion and/or all of the first data set and the second data set to one or more of the slave nodes for distributed processing. When a slave node receives the portion and/or all of the first data set and the second data set, the slave node may process the portion and/or all of the first data set and the second data set according to one or more tasks handled by the slave node.

At step 604, the slave node may perform a map task on the first data set. The map task may map the first data set, and may output a first set of key-value pairs based on the first data set. Additionally, a plurality of slave nodes may perform map tasks on a plurality of first data sets in parallel, and the intermediate outputs of the map tasks may be collected locally at each slave node.

At step 606, the slave node may perform a map task on the second data set. The map task may map the second data set, and may output a second set of key-value pairs based on the second data set. Additionally, a plurality of slave nodes may perform map tasks on a plurality of second data sets in parallel, and the intermediate outputs of the map tasks may be collected locally at each slave node.

At step 608, each slave node may estimate, using a sketch, a frequency count for each key based on the first set of key-value pairs and the second set of key-value pairs. For example, the first and second data sets may be examined to produce a workload estimation based on the sketch of the first and second data sets. A frequency counter, such as frequency counter 114 of a slave node 104, may use various algorithms, such as an algorithm that uses a lossy count and/or an algorithm that uses sketches to count the number of distinct values in the first and second set of key-value pairs. A sketch may be a data structure that provides space-efficient summaries for large and frequently updated data sets. A sketch data structure may estimate a number of distinct values that have been assigned to a particular key in a first and second set of key-value pairs. The frequency counter may estimate a number of distinct values for each key in the first and second set of key-value pairs. In one embodiment, the sketch data structure may be a count-min sketch.

Then at step 610, the slave node may determine whether the estimated frequency count for each key is greater than or equal to a predetermined threshold. At step 612, the slave node may partition a key when the frequency count associated with the key is greater than or equal to the predetermined threshold. For example, each slave node that processes map tasks may include a frequency counter for each key, and the slave node may partition a key when the frequency count associated with the key exceeds a predetermined threshold.

After step 612, the process may continue. For example, the slave node may group the values associated with the keys based on the key. Then, other slave nodes that process reduce tasks may receive a list of values for a particular key, and, after computation, output a new list of values.

Figure 7:
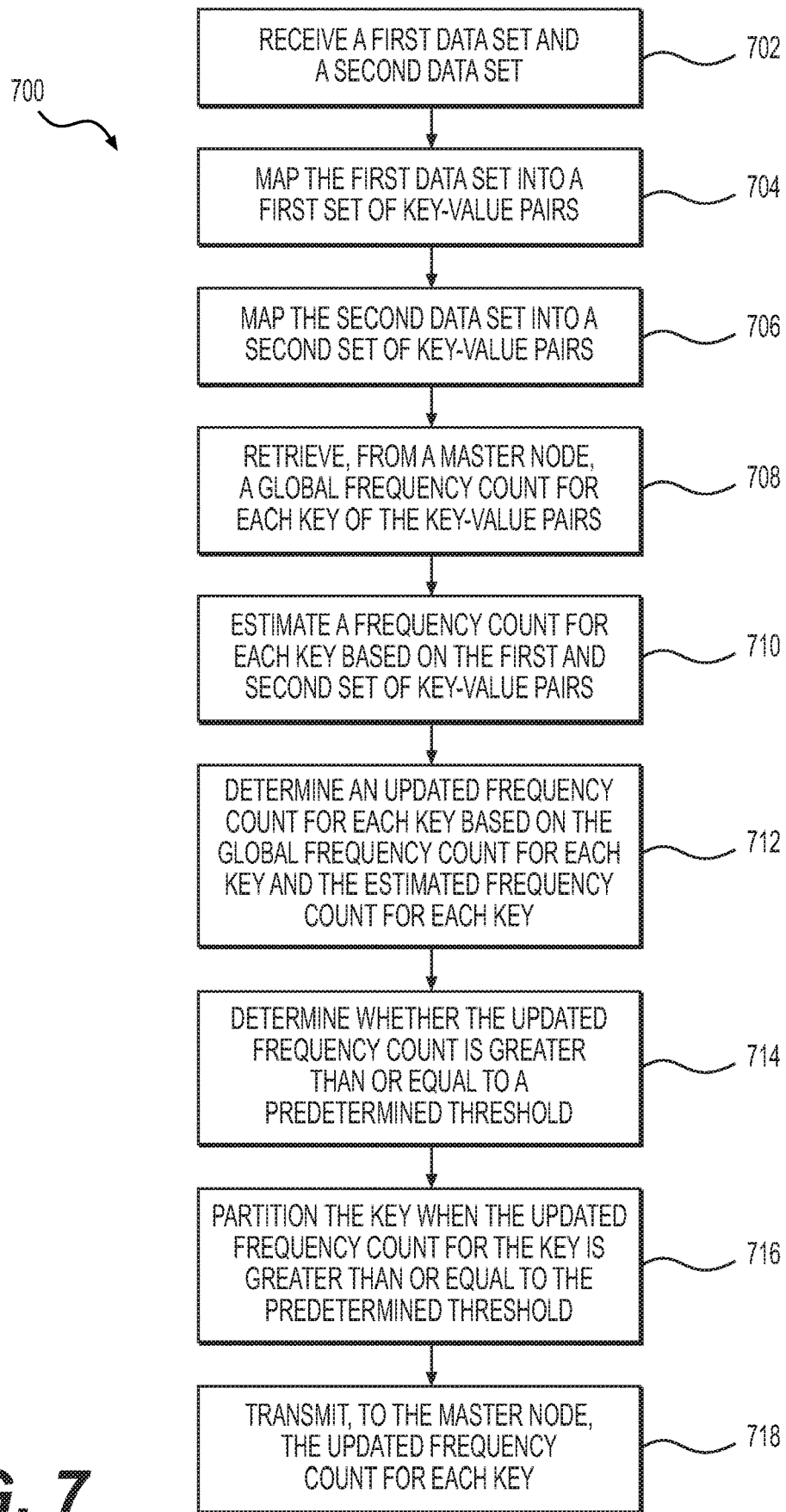
FIG. 7 depicts another method for dynamic partitioning of in a distributed environment, according to embodiments of the present disclosure.

FIG. 7 depicts another method for dynamic partitioning of in a distributed environment, according to embodiments of the present disclosure. The method 700 may begin at step 702 in which a node, such as the master node 102 and/or slave node 104, may receive a first data set and a second data set. When a master node receives the first data set and the second data set, the master node may distribute a portion and/or all of the first data set and the second data set to one or more of the slave nodes for distributed processing. When a slave node receives the portion and/or all of the first data set and the second data set, the slave node may process the portion and/or all of the first data set and the second data set according to one or more tasks handled by the slave node.

At step 704, the slave node may perform a map task on the first data set. The map task may map the first data set, and may output a first set of key-value pairs based on the first data set. Additionally, a plurality of slave nodes may perform map tasks on a plurality of first data sets in parallel, and the intermediate outputs of the map tasks may be collected locally at each slave node.

At step 706, the slave node may perform a map task on the second data set. The map task may map the second data set, and may output a second set of key-value pairs based on the second data set. Additionally, a plurality of slave nodes may perform map tasks on a plurality of second data sets in parallel, and the intermediate outputs of the map tasks may be collected locally at each slave node.

At step 708, the slave node may retrieve, from a master node, a global frequency count for each key mapped in the first and second set of key value pairs. The master node, such as master node 102, may also include a global frequency counter, such as global frequency counter 116, that maintains a global frequency count for each key. The global frequency counter 116 may also maintain a sketch, such as a count-min sketch. The frequency counters, such as frequency counters 114, of each slave node, may retrieve the global frequency count for each key from the global frequency counter.

At step 710, each slave node may estimate, using a sketch, a frequency count for each key based on the first set of key-value pairs and the second set of key-value pairs. For example, the first and second data sets may be examined to produce a workload estimation based on the sketch of the first and second data sets. A frequency counter, such as frequency counter 114 of a slave node 104, may use various algorithms, such as an algorithm that uses a lossy count and/or an algorithm that uses sketches to count the number of distinct values in the first and second set of key-value pairs. A sketch may be a data structure that provides space-efficient summaries for large and frequently updated data sets. A sketch data structure may estimate a number of distinct values that have been assigned to a particular key in a first and second set of key-value pairs. The frequency counter may estimate a number of distinct values for each key in the first and second set of key-value pairs. In one embodiment, the sketch data structure may be a count-min sketch.

At step 712, each slave node may determine an updated frequency count for each key based on the retrieved global frequency count for each key and the estimated frequency count for each key. For example, the slave node, for each key, may average the global frequency count for a key and the estimated frequency count for the key, and generated an updated frequency count for the key based on the average.

Then at step 714, the slave node may determine whether the updated frequency count for each key is greater than or equal to a predetermined threshold. At step 716, the slave node may partition a key when the updated frequency count associated with the key is greater than or equal to the predetermined threshold. For example, each slave node that processes map tasks may include a frequency counter for each key, and the slave node may partition a key when the updated frequency count associated with the key exceeds a predetermined threshold.

At step 718, the slave node may transmit, to the master node, the updated frequency count for each key. Accordingly, the master node may update the global frequency count with the updated frequency count from each slave node. After step 718, the process may continue. For example, the slave node may group the values associated with the keys based on the key. Then, other slave nodes that process reduce tasks may receive a list of values for a particular key, and, after computation, output a new list of values.

Figure 8:
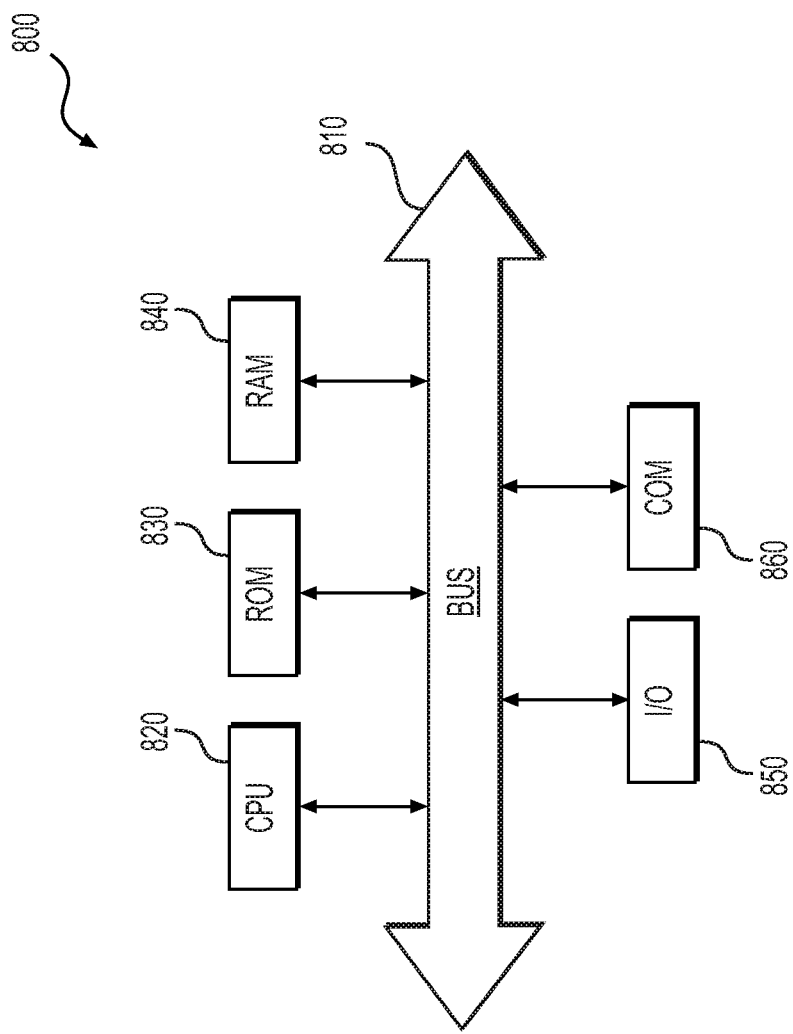
FIG. 8 is a simplified functional block diagram of a computer configured as a device for executing the methods of FIGS. 6 and 7, according to exemplary embodiments of the present disclosure.

FIG. 8 is a simplified functional block diagram of a computer that may be configured as the nodes, computing device, servers, providers, and/or network elements for executing the methods, according to exemplary an embodiment of the present disclosure. Specifically, in one embodiment, any of the nodes, computing device, servers, providers, and/or network may be an assembly of hardware 800 including, for example, a data communication interface 860 for packet data communication. The platform may also include a central processing unit ("CPU") 820, in the form of one or more processors, for executing program instructions. The platform typically includes an internal communication bus 810, program storage, and data storage for various data files to be processed and/or communicated by the platform such as ROM 830 and RAM 840, although the system 800 often receives programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

As will be recognized, the present disclosure is not limited to these particular embodiments. For instance, although described in the context of MapReduce, the present disclosure may also be used in other distributed computing environments.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer-implemented method for dynamic partitioning in distributed computing environments, the method comprising:

receiving, at a processor, a first data set and a second data set;

mapping, by the processor, the first data set into a first set of key-value pairs;

mapping, by the processor, the second data set into a second set of key-value pairs;

estimating, by the processor using a sketch, a frequency count for each key based on the first set of key-value pairs and the second set of key-value pairs;

retrieving, by the processor from a master node, a global frequency count for each key of the key-value pairs;

determining, by the processor, an updated frequency count for each key based on the global frequency count for each key and the estimated frequency count for each key;

determining, by the processor, whether the estimated frequency count for each key is greater than or equal to a predetermined threshold based on the updated frequency count for each key; and partitioning, by the processor, the key when the estimated frequency count for the key is greater than or equal to the predetermined threshold.

2. The method of claim 1, further comprising:
transmitting, by the processor to the master node, the updated frequency count for each key.

3. The method of claim 1, wherein the sketch is one of a lossy algorithm and a count-min sketch.

4. The method of claim 3, further comprising:
reducing, by the processor, the values of each set of values grouped by each key into a set of pairs.

5. The method of claim 1, further comprising:
grouping, by the processor, the values of the key-value pairs by the key to form a set of values grouped by each key.

6. A system for dynamic partitioning in distributed computing environments, the system including:
a data storage device that stores instructions for dynamic partitioning in distributed computing environments; and
a processor configured to execute the instructions to perform a method including:
receiving a first data set and a second data set;
mapping the first data set into a first set of key-value pairs;
mapping the second data set into a second set of key-value pairs;
estimating, using a sketch, a frequency count for each key based on the first set of key-value pairs and the second set of key-value pairs;
retrieving, by the processor from a master node, a global frequency count for each key of the key-value pairs;
determining, by the processor, an updated frequency count for each key based on the global frequency count for each key and the estimated frequency count for each key;
determining, by the processor, whether the estimated frequency count for each key is greater than or equal to a predetermined threshold based on the updated frequency count for each key; and
partitioning, by the processor, the key when the estimated frequency count for the key is greater than or equal to the predetermined threshold.

7. The system of claim 6, wherein the processor is further configured to execute the instructions to perform the method including:
transmitting, to the master node, the updated frequency count for each key.

8. The system of claim 6, wherein the sketch is one of a lossy algorithm and a count-min sketch.

9. The system of claim 6, wherein the processor is further configured to execute the instructions to perform the method including:
grouping the values of the key-value pairs by the key to form a set of values grouped by each key.

10. The system of claim 9, wherein the processor is further configured to execute the instructions to perform the method including:
reducing the values of each set of values grouped by each key into a set of pairs.

11. A non-transitory computer-readable medium storing instructions that, when executed by a computer, cause the computer to perform a method for dynamic partitioning in distributed computing environments, the method including:
receiving a first data set and a second data set;
mapping the first data set into a first set of key-value pairs;
mapping the second data set into a second set of key-value pairs;
estimating, using a sketch, a frequency count for each key based on the first set of key-value pairs and the second set of key-value pairs;
retrieving, by the processor from a master node, a global frequency count for each key of the key-value pairs;
determining, by the processor, an updated frequency count for each key based on the global frequency count for each key and the estimated frequency count for each key;
determining, by the processor, whether the estimated frequency count for each key is greater than or equal to a predetermined threshold based on the updated frequency count for each key; and
partitioning, by the processor, the key when the estimated frequency count for the key is greater than or equal to the predetermined threshold.

12. The computer-readable medium of claim 11, further comprising:
transmitting, to the master node, the updated frequency count for each key.

13. The computer-readable medium of claim 11, wherein the sketch is one of a lossy algorithm and a count-min sketch.

14. The computer-readable medium of claim 11, further comprising:
grouping the values of the key-value pairs by the key to form a set of values grouped by each key.

\* \* \* \* \*